April 7, 1925.   1,532,884
C. W. CHAPIN
VEHICLE BRAKE
Filed July 3, 1924
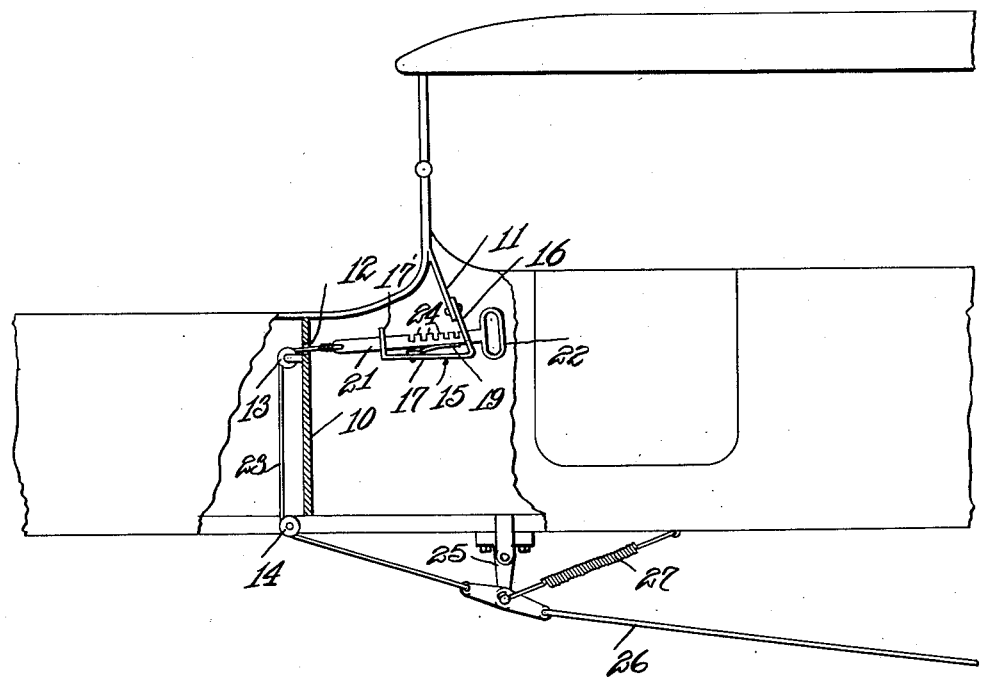
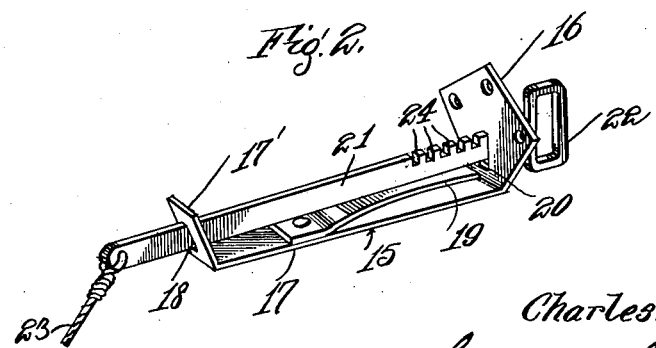
Inventor
Charles W. Chapin.
By Horace C. ~~~~
Attorney Patented Apr. 7, 1925.

1,532,884

UNITED STATES PATENT OFFICE.

CHARLES W. CHAPIN, OF LOUISVILLE, KENTUCKY.

VEHICLE BRAKE.

Application filed July 3, 1924. Serial No. 724,120.

*To all whom it may concern:*

Be it known that I, CHARLES W. CHAPIN, a citizen of the United States, residing at Louisville, in the county of Jefferson, State of Kentucky, have invented certain new and useful Improvements in Vehicle Brakes; and I do hereby declare the following to be a full, clear, and exact description of the invention, such as will enable others skilled in the art to which it appertains to make and use the same.

This invention relates to new and useful improvements in brakes, and particularly to brakes for motor driven vehicles.

One object of the invention is to provide a brake of this character which is simple in construction, formed from few parts, and one which may be installed in a vehicle without the employment of skilled persons.

Another object is to provide a brake device which is easier of operation than the ordinary vehicle brakes, and which is within more convenient reach of the driver than the ordinary hand brakes of motor vehicles.

Other objects and advantages will be apparent from the following description when taken in connection with the accompanying drawing.

In the drawing:

Figure 1 is a sectional view of a portion of an automobile, showing the invention in side elevation.

Figure 2 is a perspective view of the hand rod, and the bracket for supporting the same, removed from the automobile.

Referring particularly to the accompanying drawing, 10 represents the dashboard of the automobile, and 11 the instrument board, in connection with which the present invention is adapted for use. In the upper portion of the dashboard there is formed an opening 12, and mounted on the front face of the dashboard, immediately below the said opening, is a grooved wheel or pulley 13. Mounted on the chassis, directly beneath the pulley 13, is a second pulley 14.

An angle plate 15 has its vertical leg enlarged, as shown at 16, and said enlarged portion is secured to the apron or instrument board, while its other or horizontal leg 17 extends forwardly, in the direction of the opening 12, where its end is turned upwardly, as shown at 17', and formed with an elongated vertically disposed slot 18. Secured to the upper face of the leg 17, and extending longitudinally of said leg, is an upwardly bowed leaf spring 19. In the vertical leg, below the enlargement 16, and in that portion of the leg which lies below the lower edge of the instrument board, is a vertical slot 20. Slidably disposed through the slots 18 and 20 is a flat metal bar or rod 21, one end of which projects from the face of the vertical leg of the angle plate 15, where it is formed with a handle loop 22, while the other end, which projects beyond the upturned portion 17', has attached thereto one end of a cable 23. In the upper edge of the rod 21 there are formed the longitudinal series of notches 24 which receive the upper wall of the slot 20, when the rod is urged upwardly by the bowed spring 19 and whereby said rod is releasably held against longitudinal movement through the slots 18 and 20.

Pivotally supported on the chassis, and depending therefrom, is an arm 25, and connected to the outer end of the arm are the adjacent ends of the cables 23 and 26, and the end of the coil spring 27, said spring having its other end secured to the chassis, rearwardly of said arm, and being adapted to normally urge the said arm rearwardly to cause the slackening of the cable or rod 26, for the purpose of releasing the brakes, to which said cable or rod 26 extends and is connected.

From the drawing it will be apparent that upon grasping the handle 22, and pulling on the rod 21, the cable 23 will cause the forward rocking of the arm 25, resulting in the forward pulling of the cable 26, whereupon the brakes will be applied. It will be understood that, when the operator grasps the handle 22, he must first exert a downward pressure on the rod to act against the spring 19, so as to release the notches from the angle plate, whereupon the rod 21 may be readily moved forwardly or rearwardly, as desired, and the conditions require. When the rod 21 is moved forwardly through the slots 18 and 20, such movement is facilitated by the spring 27, while when the rod is pulled rearwardly the spring is stretched, or placed under tension.

What is claimed is:—

A brake operating device for an automobile including an angle bracket adapted to be mounted on the instrument board of the automobile and having longitudinally alined slots, a leaf spring carried by the bracket, and a notched rod slidable through the slots of the bracket and urged into engagement with the bracket by the said spring, and means for connecting the slidable rod with the brake rod of the automobile.

In testimony whereof, I affix my signature, in the presence of two witnesses.

CHARLES W. CHAPIN.

Witnesses:
 PHILIP S. LONGEST,
 FRED J. HARLSMEIER.